(12) United States Patent
Wong et al.

(10) Patent No.: US 9,580,285 B2
(45) Date of Patent: Feb. 28, 2017

(54) METHOD AND APPARATUS FOR USING UNIQUE LANDMARKS TO LOCATE INDUSTRIAL VEHICLES AT START-UP

(71) Applicant: Crown Equipment Limited, Tamaki (NZ)

(72) Inventors: Lisa Wong, Auckland (NZ); Andrew Evan Graham, Waitakere (NZ); Christopher W. Goode, Auckland (NZ); Lucas B. Waltz, Coldwater (NZ)

(73) Assignee: Crown Equipment Corporation, New Bremen, OH (US)

( * ) Notice: Subject to any disclaimer, the term of this patent is extended or adjusted under 35 U.S.C. 154(b) by 41 days.

(21) Appl. No.: 14/254,953

(22) Filed: Apr. 17, 2014

(65) Prior Publication Data

US 2014/0214258 A1    Jul. 31, 2014

Related U.S. Application Data

(63) Continuation of application No. 14/079,842, filed on Nov. 14, 2013, now Pat. No. 9,206,023, which is a
(Continued)

(51) Int. Cl.
*B66F 9/06* (2006.01)
*G05G 1/00* (2006.01)
(Continued)

(52) U.S. Cl.
CPC ............ *B66F 9/063* (2013.01); *G01C 21/206* (2013.01); *G01S 5/08* (2013.01); *G01S 5/16* (2013.01);
(Continued)

(58) Field of Classification Search
None
See application file for complete search history.

(56) References Cited

U.S. PATENT DOCUMENTS

| 4,043,418 A | 8/1977 | Blakeslee |
| 4,071,740 A | 1/1978 | Gogulski |

(Continued)

FOREIGN PATENT DOCUMENTS

| DE | 19757333 C1 | 9/1999 |
| DE | 10220936 A1 | 12/2003 |

(Continued)

OTHER PUBLICATIONS

Extended European search report dated Nov. 18, 2014 pertaining to European Patent Application No. 12789246.1.
(Continued)

*Primary Examiner* — Calvin Cheung
*Assistant Examiner* — Kevin P Mahne
(74) *Attorney, Agent, or Firm* — Dinsmore & Shohl LLP (57) ABSTRACT

A method and apparatus for using unique landmarks to position industrial vehicles during start-up. In one embodiment, a method of using pre-positioned objects as landmarks to operate an industrial vehicle is provided. The method comprises identifying a start-up scenario from sensor data, wherein the start-up scenario comprises a unique marker start-up or a pre-positioned object start-up. in response to the identified start-up scenario, either a unique marker or pre-positioned object is identified within a physical environment, wherein the pre-positioned object or unique marker corresponds with a sub-area of the physical environment. The industrial vehicle pose is determined in response to the identity of the pre-positioned object or unique marker and the industrial vehicle is operated based on the determined industrial vehicle pose.

9 Claims, 6 Drawing Sheets

Related U.S. Application Data continuation of application No. 13/672,260, filed on Nov. 8, 2012, now abandoned, which is a continuation of application No. PCT/US2012/052247, filed on Aug. 24, 2012, which is a continuation of application No. 13/219,271, filed on Aug. 26, 2011, now abandoned.

(51) Int. Cl.

| | | |
|---|---|---|
| *G05G 1/02* | (2006.01) | |
| *G06F 17/00* | (2006.01) | |
| *G01C 21/20* | (2006.01) | |
| *G01S 5/16* | (2006.01) | |
| *G01S 17/02* | (2006.01) | |
| *G01S 17/08* | (2006.01) | |
| *G01S 17/87* | (2006.01) | |
| *G01S 5/08* | (2006.01) | |
| *G07C 5/08* | (2006.01) | |

(52) U.S. Cl.
CPC .......... *G01S 17/023* (2013.01); *G01S 17/08* (2013.01); *G01S 17/875* (2013.01); *G06F 17/00* (2013.01); *G07C 5/08* (2013.01)

(56) References Cited

U.S. PATENT DOCUMENTS

| | | |
|---|---|---|
| 4,483,407 A | 11/1984 | Iwamoto et al. |
| 4,530,056 A | 7/1985 | MacKinnon et al. |
| 4,674,048 A | 6/1987 | Okumura |
| 4,746,977 A | 5/1988 | White |
| 4,750,123 A | 6/1988 | Christian |
| 4,782,920 A | 11/1988 | Gaibler et al. |
| 4,800,977 A | 1/1989 | Boegli et al. |
| 4,816,998 A | 3/1989 | Ahlbom |
| 4,847,769 A | 7/1989 | Reeve |
| 4,855,915 A | 8/1989 | Dallaire |
| 4,858,132 A | 8/1989 | Holmquist |
| 4,875,172 A | 10/1989 | Kanayama |
| 4,944,357 A | 7/1990 | Wible et al. |
| 4,996,468 A | 2/1991 | Field et al. |
| 5,011,358 A | 4/1991 | Andersen et al. |
| 5,051,906 A | 9/1991 | Evans, Jr. et al. |
| 5,170,352 A | 12/1992 | McTamaney et al. |
| 5,175,480 A | 12/1992 | McKeefery et al. |
| 5,202,832 A | 4/1993 | Lisy |
| 5,208,753 A | 5/1993 | Acuff |
| 5,276,618 A | 1/1994 | Everett, Jr. |
| 5,283,739 A | 2/1994 | Summerville et al. |
| 5,315,517 A | 5/1994 | Kawase et al. |
| 5,324,948 A | 6/1994 | Dudar et al. |
| 5,350,033 A | 9/1994 | Kraft |
| 5,367,458 A | 11/1994 | Roberts et al. |
| 5,402,344 A | 3/1995 | Reister et al. |
| 5,446,356 A | 8/1995 | Kim |
| 5,461,292 A | 10/1995 | Zondlo |
| 5,471,393 A | 11/1995 | Bolger |
| 5,487,009 A | 1/1996 | Hill |
| 5,488,277 A | 1/1996 | Nishikawa et al. |
| 5,491,670 A | 2/1996 | Weber |
| 5,515,934 A | 5/1996 | Davis |
| 5,535,843 A | 7/1996 | Takeda et al. |
| 5,539,638 A | 7/1996 | Keeler et al. |
| 5,545,960 A | 8/1996 | Ishikawa |
| 5,548,511 A | 8/1996 | Bancroft |
| 5,548,512 A | 8/1996 | Quraishi |
| 5,559,696 A | 9/1996 | Borenstein |
| 5,568,030 A | 10/1996 | Nishikawa et al. |
| 5,586,620 A | 12/1996 | Dammeyer et al. |
| 5,612,883 A | 3/1997 | Shaffer et al. |
| 5,646,845 A | 7/1997 | Gudat et al. |
| 5,652,489 A | 7/1997 | Kawakami |
| 5,680,306 A | 10/1997 | Shin et al. |
| 5,682,317 A | 10/1997 | Keeler et al. |
| 5,684,696 A | 11/1997 | Rao et al. |
| 5,687,294 A | 11/1997 | Jeong |
| 5,709,007 A | 1/1998 | Chiang |
| 5,739,657 A | 4/1998 | Takayama et al. |
| 5,764,014 A | 6/1998 | Jakeway et al. |
| 5,819,008 A | 10/1998 | Asama et al. |
| 5,819,863 A | 10/1998 | Zollinger et al. |
| 5,867,800 A | 2/1999 | Leif |
| 5,908,466 A | 6/1999 | Veugen et al. |
| 5,911,767 A | 6/1999 | Garibotto et al. |
| 5,916,285 A | 6/1999 | Alofs et al. |
| 5,938,710 A | 8/1999 | Lanza et al. |
| 5,941,935 A | 8/1999 | Fernandez |
| 5,942,869 A | 8/1999 | Katou et al. |
| 5,961,571 A | 10/1999 | Gorr et al. |
| 6,012,003 A | 1/2000 | Astrom |
| 6,038,501 A | 3/2000 | Kawakami |
| 6,041,274 A | 3/2000 | Onishi et al. |
| 6,046,565 A | 4/2000 | Thorne |
| 6,092,010 A | 7/2000 | Alofs et al. |
| 6,122,572 A | 9/2000 | Yavnai |
| 6,208,916 B1 | 3/2001 | Hori |
| 6,246,930 B1 | 6/2001 | Hori |
| 6,269,291 B1 | 7/2001 | Segeren |
| 6,272,405 B1 | 8/2001 | Kubota |
| 6,285,951 B1 | 9/2001 | Gaskins et al. |
| 6,295,503 B1 | 9/2001 | Inoue et al. |
| 6,308,118 B1 | 10/2001 | Holmquist |
| 6,314,341 B1 | 11/2001 | Kanayama |
| 6,325,749 B1 | 12/2001 | Inokuchi et al. |
| 6,338,013 B1 | 1/2002 | Ruffner |
| 6,360,165 B1 | 3/2002 | Chowdhary |
| 6,370,453 B2 | 4/2002 | Sommer |
| 6,374,155 B1 | 4/2002 | Wallach et al. |
| 6,385,515 B1 | 5/2002 | Dickson et al. |
| 6,442,476 B1 | 8/2002 | Poropat |
| 6,445,983 B1 | 9/2002 | Dickson et al. |
| 6,446,005 B1 | 9/2002 | Bingeman et al. |
| 6,453,223 B1 | 9/2002 | Kelly et al. |
| 6,454,036 B1 | 9/2002 | Airey et al. |
| 6,459,955 B1 | 10/2002 | Bartsch et al. |
| 6,459,966 B2 | 10/2002 | Nakano et al. |
| 6,461,355 B2 | 10/2002 | Svejkovsky et al. |
| 6,470,300 B1 | 10/2002 | Benzinger et al. |
| 6,493,614 B1 | 12/2002 | Jung |
| 6,496,755 B2 | 12/2002 | Wallach et al. |
| 6,502,017 B2 | 12/2002 | Ruffner |
| 6,539,294 B1 | 3/2003 | Kageyama |
| 6,580,246 B2 | 6/2003 | Jacobs |
| 6,584,375 B2 | 6/2003 | Bancroft et al. |
| 6,629,735 B1 | 10/2003 | Galy |
| 6,636,802 B1 | 10/2003 | Nakano et al. |
| 6,641,355 B1 | 11/2003 | McInerney et al. |
| 6,667,592 B2 | 12/2003 | Jacobs et al. |
| 6,816,085 B1 | 11/2004 | Haynes et al. |
| 6,842,692 B2 | 1/2005 | Fehr et al. |
| 6,917,839 B2 | 7/2005 | Bickford |
| 6,922,632 B2 | 7/2005 | Foxlin |
| 6,934,615 B2 | 8/2005 | Flann et al. |
| 6,946,565 B2 | 9/2005 | Fedouloff et al. |
| 6,952,488 B2 | 10/2005 | Kelly et al. |
| 7,015,831 B2 | 3/2006 | Karlsson et al. |
| 7,076,336 B2 | 7/2006 | Murray, IV et al. |
| 7,100,725 B2 | 9/2006 | Thorne |
| 7,147,147 B1 | 12/2006 | Enright et al. |
| 7,148,458 B2 | 12/2006 | Schell et al. |
| 7,162,056 B2 | 1/2007 | Burl et al. |
| 7,162,338 B2 | 1/2007 | Goncalves et al. |
| 7,177,737 B2 | 2/2007 | Karlsson et al. |
| 7,246,007 B2 | 7/2007 | Ferman |
| 7,272,467 B2 | 9/2007 | Goncalves et al. |
| 7,295,114 B1 | 11/2007 | Drzaic et al. |
| 7,305,287 B2 | 12/2007 | Park |
| 7,343,232 B2 | 3/2008 | Duggan et al. |
| 7,386,163 B2 | 6/2008 | Sabe et al. |
| 7,451,021 B2 | 11/2008 | Wilson |
| 7,451,030 B2 | 11/2008 | Eglington et al. |
| 7,499,796 B2 | 3/2009 | Listle et al. |
| 7,539,563 B2 | 5/2009 | Yang et al. |

(56) References Cited

U.S. PATENT DOCUMENTS

| | | |
|---|---|---|
| 7,610,123 B2 | 10/2009 | Han et al. |
| 7,646,336 B2 | 1/2010 | Tan et al. |
| 7,650,231 B2 | 1/2010 | Gadler |
| 7,679,532 B2 | 3/2010 | Karlsson et al. |
| 7,688,225 B1 | 3/2010 | Haynes et al. |
| 7,689,321 B2 | 3/2010 | Karlsson |
| 7,720,554 B2 | 5/2010 | DiBernardo et al. |
| 7,734,385 B2 | 6/2010 | Yang et al. |
| 7,739,006 B2 | 6/2010 | Gillula |
| 7,844,364 B2 | 11/2010 | McLurkin et al. |
| 7,996,097 B2 | 8/2011 | DiBernardo et al. |
| 8,020,657 B2 | 9/2011 | Allard et al. |
| 8,050,863 B2 | 11/2011 | Trepagnier et al. |
| 8,103,383 B2 | 1/2012 | Nakamura |
| 8,126,642 B2 | 2/2012 | Trepagnier et al. |
| 8,150,650 B2 | 4/2012 | Goncalves et al. |
| 8,204,679 B2 | 6/2012 | Nakamura |
| 8,255,107 B2 | 8/2012 | Yang et al. |
| 8,271,069 B2 | 9/2012 | Jascob et al. |
| 8,280,623 B2 | 10/2012 | Trepagnier et al. |
| 8,296,065 B2 | 10/2012 | Haynie et al. |
| 8,538,577 B2 | 9/2013 | Bell et al. |
| 2002/0049530 A1 | 4/2002 | Poropat |
| 2002/0095239 A1 | 7/2002 | Wallach et al. |
| 2002/0118111 A1 | 8/2002 | Brown et al. |
| 2002/0165638 A1 | 11/2002 | Bancroft et al. |
| 2002/0165790 A1 | 11/2002 | Bancroft et al. |
| 2003/0030398 A1 | 2/2003 | Jacobs et al. |
| 2003/0030399 A1 | 2/2003 | Jacobs |
| 2003/0212472 A1 | 11/2003 | McKee |
| 2003/0236590 A1 | 12/2003 | Park et al. |
| 2004/0002283 A1 | 1/2004 | Herbert et al. |
| 2004/0010337 A1 | 1/2004 | Mountz |
| 2004/0030493 A1 | 2/2004 | Pechatnikov et al. |
| 2004/0073337 A1 | 4/2004 | McKee et al. |
| 2004/0093116 A1 | 5/2004 | Mountz |
| 2004/0093650 A1 | 5/2004 | Martins et al. |
| 2004/0111184 A1 | 6/2004 | Chiappetta et al. |
| 2004/0195012 A1 | 10/2004 | Song et al. |
| 2004/0202351 A1 | 10/2004 | Park et al. |
| 2004/0249504 A1 | 12/2004 | Gutmann et al. |
| 2005/0004702 A1 | 1/2005 | McDonald |
| 2005/0027443 A1* | 2/2005 | Cato ............... G06Q 10/0875 701/472 |
| 2005/0029029 A1 | 2/2005 | Thorne |
| 2005/0075116 A1 | 4/2005 | Laird et al. |
| 2005/0080524 A1 | 4/2005 | Park |
| 2005/0131645 A1 | 6/2005 | Panopoulos |
| 2005/0140524 A1 | 6/2005 | Kato et al. |
| 2005/0149256 A1* | 7/2005 | Lawitzky ............ G05D 1/0274 701/408 |
| 2005/0182518 A1 | 8/2005 | Karlsson |
| 2005/0216126 A1 | 9/2005 | Koselka et al. |
| 2005/0234679 A1 | 10/2005 | Karlsson |
| 2005/0244259 A1 | 11/2005 | Chilson et al. |
| 2005/0246078 A1 | 11/2005 | Vercammen |
| 2005/0246248 A1 | 11/2005 | Vesuna |
| 2006/0012493 A1 | 1/2006 | Karlsson et al. |
| 2006/0053057 A1 | 3/2006 | Michael |
| 2006/0055530 A1 | 3/2006 | Wang et al. |
| 2006/0061476 A1 | 3/2006 | Patil et al. |
| 2006/0095170 A1 | 5/2006 | Yang et al. |
| 2006/0170565 A1 | 8/2006 | Husak et al. |
| 2006/0181391 A1 | 8/2006 | McNeill et al. |
| 2006/0184013 A1 | 8/2006 | Emanuel et al. |
| 2006/0218374 A1 | 9/2006 | Ebert |
| 2006/0267731 A1 | 11/2006 | Chen |
| 2006/0293810 A1 | 12/2006 | Nakamoto |
| 2007/0018811 A1* | 1/2007 | Gollu ............... G06Q 10/087 340/539.13 |
| 2007/0018820 A1 | 1/2007 | Chand et al. |
| 2007/0027612 A1 | 2/2007 | Barfoot et al. |
| 2007/0050088 A1 | 3/2007 | Murray, IV et al. |
| 2007/0061043 A1 | 3/2007 | Ermakov et al. |
| 2007/0090973 A1 | 4/2007 | Karlsson et al. |
| 2007/0106465 A1 | 5/2007 | Adam et al. |
| 2007/0118286 A1 | 5/2007 | Wang et al. |
| 2007/0150097 A1 | 6/2007 | Chae et al. |
| 2007/0153802 A1 | 7/2007 | Anke et al. |
| 2007/0213869 A1 | 9/2007 | Bandringa et al. |
| 2007/0244640 A1 | 10/2007 | Hirokawa |
| 2007/0262884 A1 | 11/2007 | Goncalves et al. |
| 2008/0015772 A1 | 1/2008 | Sanma et al. |
| 2008/0042839 A1 | 2/2008 | Grater et al. |
| 2008/0046170 A1 | 2/2008 | DeGrazia |
| 2008/0167817 A1 | 7/2008 | Hessler et al. |
| 2008/0199298 A1 | 8/2008 | Chilson et al. |
| 2008/0272193 A1 | 11/2008 | Silverbrook et al. |
| 2009/0005986 A1 | 1/2009 | Soehren |
| 2009/0012667 A1 | 1/2009 | Matsumoto et al. |
| 2009/0140887 A1 | 6/2009 | Breed et al. |
| 2009/0198371 A1 | 8/2009 | Emanuel et al. |
| 2009/0210092 A1 | 8/2009 | Park et al. |
| 2009/0216438 A1 | 8/2009 | Shafer |
| 2009/0306946 A1 | 12/2009 | Badler et al. |
| 2010/0021272 A1 | 1/2010 | Ward et al. |
| 2010/0023257 A1 | 1/2010 | Machino |
| 2010/0161224 A1 | 6/2010 | Lee et al. |
| 2010/0204974 A1 | 8/2010 | Israelsen et al. |
| 2010/0222925 A1 | 9/2010 | Anezaki |
| 2010/0256908 A1 | 10/2010 | Shimshoni et al. |
| 2010/0268697 A1 | 10/2010 | Karlsson et al. |
| 2010/0286905 A1 | 11/2010 | Goncalves et al. |
| 2010/0286908 A1 | 11/2010 | Tate, Jr. et al. |
| 2010/0286909 A1 | 11/2010 | Tate, Jr. et al. |
| 2010/0312386 A1 | 12/2010 | Chrysanthakopoulos et al. |
| 2011/0010023 A1 | 1/2011 | Kunzig et al. |
| 2011/0085426 A1 | 4/2011 | Kwon et al. |
| 2011/0121068 A1 | 5/2011 | Emanuel et al. |
| 2011/0125323 A1 | 5/2011 | Gutmann et al. |
| 2011/0148714 A1 | 6/2011 | Schantz et al. |
| 2011/0150348 A1 | 6/2011 | Anderson |
| 2011/0153338 A1 | 6/2011 | Anderson |
| 2011/0163160 A1 | 7/2011 | Zini et al. |
| 2011/0216185 A1 | 9/2011 | Laws et al. |
| 2011/0218670 A1 | 9/2011 | Bell et al. |
| 2011/0230207 A1 | 9/2011 | Hasegawa |
| 2012/0035797 A1 | 2/2012 | Oobayashi et al. |
| 2012/0101784 A1 | 4/2012 | Lindores et al. |
| 2012/0191272 A1 | 7/2012 | Andersen et al. |
| 2012/0239224 A1 | 9/2012 | McCabe et al. |
| 2012/0287280 A1 | 11/2012 | Essati et al. |
| 2012/0323431 A1 | 12/2012 | Wong et al. |
| 2013/0006420 A1 | 1/2013 | Karlsson et al. |
| 2013/0101230 A1 | 4/2013 | Holeva et al. |
| 2013/0275045 A1 | 10/2013 | Tsujimoto et al. |
| 2014/0350831 A1 | 11/2014 | Hoffman et al. |

FOREIGN PATENT DOCUMENTS

| | | |
|---|---|---|
| DE | 10234730 A1 | 2/2004 |
| DE | 102007021693 A1 | 11/2008 |
| EP | 0508793 A2 | 10/1992 |
| EP | 1 034 984 A2 | 9/2000 |
| EP | 1201536 A2 | 5/2002 |
| EP | 1 731 982 A1 | 12/2006 |
| EP | 1732247 A1 | 12/2006 |
| EP | 1995206 A1 | 11/2008 |
| EP | 2 385 435 A1 | 11/2011 |
| GB | 2389947 A | 12/2003 |
| JP | 52-066260 | 6/1977 |
| JP | 60067818 | 4/1985 |
| JP | 2000255716 B1 | 9/2000 |
| JP | 2002048579 | 2/2002 |
| JP | 2002108446 | 4/2002 |
| JP | 2005114546 | 4/2005 |
| KR | 10-0814456 B3 | 3/2008 |
| WO | 01/67749 A2 | 9/2001 |
| WO | 02083546 A1 | 10/2002 |
| WO | 03042916 A1 | 5/2003 |
| WO | 03096052 A2 | 11/2003 |
| WO | WO03096052 A2 | 11/2003 |
| WO | 2004015510 A1 | 2/2004 |
| WO | 2005068272 A2 | 7/2005 |

(56) References Cited

FOREIGN PATENT DOCUMENTS

| WO | 2006/128124 A2 | 11/2006 |
|---|---|---|
| WO | 2011044298 A2 | 4/2011 |
| WO | 2011085426 A1 | 7/2011 |
| WO | 2012166970 A1 | 12/2012 |

OTHER PUBLICATIONS

Office Action dated Dec. 31, 2014 pertaining to Chinese Patent Application No. 201280036678.4.
Office Action dated Mar. 4, 2015 pertaining to U.S. Appl. No. 14/110,950.
Hesch, J. et al.; A Laser-Aided Inertial Navigation System (L-INS) for Human Localization in Unknown Indoor Environments; 2010 IEEE International Conference on Robotics and Automation; May 3-8, 2010; pp. 5376-5382; Anchorage, Alaska.
Guizzo, "Three Engineer Hundres of Robots One Warehouse", Spectrum IEEE, vol. 45, Issue 7, pp. 26-34, Jul. 2008.
Written Opinion of the International Searching Authority, mailed Nov. 30, 2011 for PCT Application No. PCT/NZ2011/000025.
Borenstein et al., "Mobile Robot Positioning—Sensors and Techniques", Journal of Robotic Systems, Special Issue on Mobile Robots, vol. 14, No. 4, pp. 231-249, Apr. 1997.
Harmon et al., "A Technique for Coordinating Autonomous Robots", Autonomous Systems Branch Naval Ocean Systems Center San Diego, CA 92152, 1986.
Jensfelt et al., "Laser Based Position Acquisition and Tracking in an Indoor Environment", Proc. Inst. Symp. Robotics and Automation, 1998.
Siadat et al., "An Optimized Segmentation Method for a 2D Laser-Scanner Applied to Mobile Robot Navigation", Proceedings of the 3rd IFAS Symposium on Intelligent Components and Instruments for Control Applications, 1997.
Office Action pertaining to U.S. Appl. No. 13/159,500 dated Mar. 26, 2013.
Office Action pertaining to U.S. Appl. No. 13/219,271 dated Feb. 25, 2013.
Office Action pertaining to U.S. Appl. No. 13/153,743 dated Mar. 4, 2013.
Office Action pertaining to U.S. Appl. No. 13/159,501 dated Jan. 10, 2013.
Office Action pertaining to U.S. Appl. No. 12/948,358 dated Apr. 8, 2013.
International Search Report and Written Opinion pertaining to International Patent Application No. PCT/NZ2012/000084 dated Jan. 30, 2013.
International Search Report and Written Opinion pertaining to International Patent Application No. PCT/NZ2012/000051 dated Jan. 2, 2013.
International Search Report and Written Opinion pertaining to International Patent Application No. PCT/NZ2012/000091 dated Oct. 31, 2013.
International Search Report and Written Opinion pertaining to International Patent Application No. PCT/US2012/054062 dated Nov. 27, 2012.
International Search Report and Written Opinion pertaining to International Patent Application No. PCT/US2012/052247 dated Nov. 27, 2012.
International Search Report and Written Opinion pertaining to International Patent Application No. PCT/NZ2011/000024 dated Dec. 7, 2011.
Office Action (Final Rejection) pertaining to U.S. Appl. No. 12/660,616 dated Nov. 27, 2012.
Office Action pertaining to U.S. Appl. No. 13/672,260 dated May 8, 2013.
Office Action pertaining to U.S. Appl. No. 13/159,501 dated Jun. 4, 2013.
Office Action pertaining to U.S. Appl. No. 13/227,165 dated Jul. 12, 2013.
Office Action pertaining to U.S. Appl. No. 12/718,620 dated May 21, 2013.
Azizi et al., "Mobile Robot Position Determination", Recent Advances in Mobile Robotics, Dr. Andon Topalov (Ed.), ISBN: 978-953-307-909-7, In Tech, Available from: http://www.intechopen.com/books/recent-advances-in-mobile-robotics/mobile-robot-position-determination, pp. 737-742.
Feng et al., "Model-based calibration for sensor networks", Proceedings of IEEE, vol. 2, pp. 737-742, Print ISBN: 0-7803-8133-5, Sensors, 2003.
Ibanez-Guzman et al., "Unmanned Tracked Ground Vehicle for Natural Environments", Nanyang Technological University, School of Computer Science, Sinapore, 9 pages.
Xia et al., "Vision-Based Global Localization for Intelligent Vehicles", Research Institute of Robotics, Automation Department, Shanghao Jiao Tong University, P.R. China, Intelligent Vehicles Symposium in Tokyo Japan, Jun. 13-15, 2006, 6 pages.
Office Action pertaining to U.S. Appl. No. 12/948,358 dated Aug. 24, 2012.
Office Action pertaining to U.S. Appl. No. 12/948,358 dated Apr. 5, 2012.
Office Action pertaining to U.S. Appl. No. 13/116,600 dated Dec. 31, 2012.
Office Action pertaining to U.S. Appl. No. 13/300,041 dated Sep. 19, 2013.
Notice of Allowance pertaining to U.S. Appl. No. 13/300,041 dated Dec. 16, 2013.
Office Action dated May 8, 2015 pertaining to U.S. Appl. No. 14/079,842.
Korean Notice of Preliminary Rejection dated May 1, 2014, for Korean Application No. 10-2014-7000894.
Australian Examination Report dated Jun. 13, 2014, for Australian Application No. 2011221652.
Office Action dated Jun. 4, 2014, for U.S. Appl. No. 13/672,391.
Australian Examination Report dated May 1, 2014, for Australian Application No. 2012300353.
Australian Examination Report dated May 14, 2014, for Australian Application No. 2012259536.
Australian Examination Report dated Jun. 5, 2014, for Australian Application No. 2012243484.
European Search Report for Application No. 12770733.9 dated Sep. 1, 2014.
Thomson et al., "Efficient Scheduling for Multiple Automated Non-Holonomic Vehicles using a Coordinated Path Planner", IEEE International Conference on Robotics and Automation (ICRA), , pp. 1-4, May 9, 2011.
Australian Examination Report pertaining to Australian Patent No. 2012304464 dated Jul. 23, 2014.
Office Action pertaining to U.S. Appl. No. 14/110,950, dated Sep. 30, 2014.
Yong, "Real-time Dynamic Path Planning for Dubins' Nonholonomic Robot", 45th IEEE Conference on Decision and Control, pp. 2418-2423, 2006.
Extended European Search Report dated Sep. 5, 2014 pertaining to European Application No. 11750974.5.
Communication pursuant to Rules 161(1) and 162 EPC dated Apr. 17, 2014 pertaining to European Application No. 12773426.7.
Korean Preliminary Rejection dated Aug. 29, 2014 pertaining to the Korean Application No. 10-2014-7000140.
Office Action dated Aug. 31, 2015 pertaining to Chinese Patent Application No. 201280041527.8.
Patent Examination Report No. 1 dated Apr. 22, 2016 pertaining to Australian Patent Application No. 2015203030.
Communication pursuant to Rule 164(2)(b) and Article 94(3) EPC dated Jun. 21, 2016 pertaining to European Patent Application No. 12769782.9.
European Search Report mailed on May 2, 2016 in relating European Application No. 14198585.3.

\* cited by examiner

METHOD AND APPARATUS FOR USING UNIQUE LANDMARKS TO LOCATE INDUSTRIAL VEHICLES AT START-UP

CROSS-REFERENCE TO RELATED APPLICATIONS

This application is filed as a continuation of U.S. application Ser. No. 14/079,842 filed Nov. 14, 2013, which is a continuation of U.S. application Ser. No. 13/672,260 filed Nov. 8, 2012, which is a continuation of PCT/US2012/052247 filed on Aug. 24, 2012, which claims priority to U.S. patent application Ser. No. 13/219,271, filed Aug. 26, 2011.

BACKGROUND

Technical Field

Embodiments of the present invention generally relate to industrial vehicle navigation systems and, more particularly, to a method and apparatus for using unique landmarks to localize an industrial vehicle.

Description of the Related Art

Entities regularly operate numerous facilities in order to meet supply and/or demand goals. For example, small to large corporations, government organizations, and/or the like employ a variety of logistics management and inventory management paradigms to move objects (e.g., raw materials, goods, machines, and/or the like) into a variety of physical environments (e.g., warehouses, cold rooms, factories, plants, stores, and/or the like). A multinational company may build warehouses in one country to store raw materials for manufacture into goods, which are housed in a warehouse in another country for distribution into local retail markets. The warehouses must be well-organized in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. Warehouses and other shared use spaces, for instance, must be safe for a human work force. Some employees operate heavy machinery and industrial vehicles, such as forklifts, which have the potential to cause severe or deadly injury. Nonetheless, human beings are required to use the industrial vehicles to complete tasks, which include object handling tasks, such as moving pallets of goods to different locations within a warehouse. Most warehouses employ a large number of forklift drivers and forklifts to move objects. In order to increase productivity, these warehouses simply add more forklifts and forklift drivers.

Some warehouses utilize equipment for automating these tasks. As an example, these warehouses may employ automated industrial vehicles, such as forklifts, to carry objects on paths and then, unload these objects onto designated locations. When navigating an industrial vehicle, it is imperative that vehicle pose computations are accurate. A vehicle pose in this context means its position and heading information, generally a pose refers to a position of an object in space with a coordinate frame having orthogonal axes with a known origin and the rotations about each of those axes or a subset of such positions and rotations. If the industrial vehicle cannot determine a current position on a map, the industrial vehicle is unable to execute tasks without prior knowledge of the physical environment. Furthermore, it is essential that the industrial vehicle perform accurate localization at start-up where there are few unique natural features, as inaccurate vehicle pose computations are detrimental to accurate vehicle navigation. Localization at start-up refers to any time a vehicle does not have a current pose such as after powering up or during operation when there is no currently valid pose.

Therefore, there is a need in the art for a method and apparatus for using unique markers for start-up localization of an industrial vehicle without prior knowledge of a position in the physical environment.

SUMMARY

Various embodiments of the present disclosure generally comprise a method and apparatus for using unique landmarks to position industrial vehicles during start-up. In one embodiment, a method of using pre-positioned objects as landmarks to operate an industrial vehicle is provided. The method comprises identifying a start-up scenario from sensor data, wherein the start-up scenario comprises a unique marker start-up or a pre-positioned object start-up. In response to the identified start-up scenario, either a unique marker or pre-positioned object is identified within a physical environment, wherein the pre-positioned object or unique marker corresponds with a sub-area of the physical environment. The industrial vehicle pose is determined in response to the identity of the pre-positioned object or unique marker and the industrial vehicle is operated based on the determined industrial vehicle pose.

In another embodiment, a computer is coupled to an industrial vehicle and comprises an environment based navigation module for identifying a start-up scenario from sensor data and enabling operation of the vehicle based on a determined industrial vehicle pose. In a further embodiment, a computer-readable-storage medium is provided comprising one or more processor-executable instructions that, when executed by a processor, enables operation of the vehicle based on a determined industrial vehicle pose.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
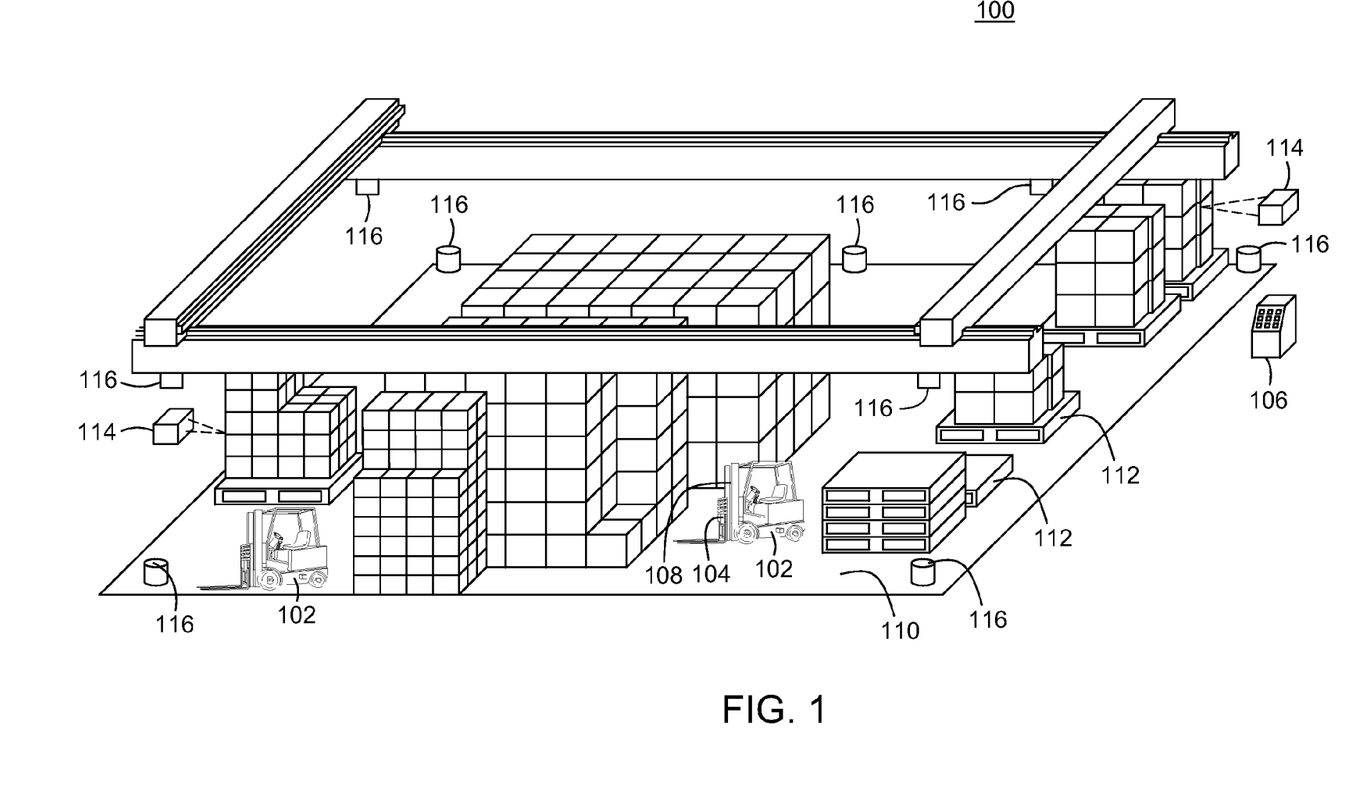
FIG. 1 is a perspective view of a physical environment comprising various embodiments of the present disclosure.

FIG. 1 illustrates a schematic, perspective view of a physical environment 100 comprising one or more embodiments of the present invention.

In some embodiments, the physical environment 100 includes a vehicle 102 that is coupled to a mobile computer 104, a central computer 106 as well as a sensor array 108. The sensor array 108 includes a plurality of devices for analyzing various objects within the physical environment 100 and transmitting data (e.g., image data, video data, range map data, three-dimensional graph data and/or the like) to the mobile computer 104 and/or the central computer 106, as explained further below. The sensor array 108 includes various types of sensors, such as encoders, ultrasonic range finders, laser range finders, pressure transducers and/or the like.

The physical environment 100 further includes a floor 110 supporting a plurality of objects. The plurality of objects include a plurality of pallets 112, a plurality of units 114 and/or the like as explained further below. The physical environment 100 also includes various obstructions (not pictured) to the proper operation of the vehicle 102. Some of the plurality of objects may constitute as obstructions along various paths (e.g., pre-programmed or dynamically computed routes) if such objects disrupt task completion.

The physical environment 100 also includes a plurality of markers 116. The plurality of markers 116 are illustrated as objects attached to a ceiling. In some embodiments, the plurality of markers 116 are beacons, some of which are unique or provide a unique configuration, that facilitate environment based navigation as explained further below. The plurality of markers 116 as well as other objects around the physical environment 100 form environment features. The mobile computer 104 extracts the environment features and determines an accurate, current vehicle pose and the vehicle 102 is then operated based on the determined industrial vehicle pose.

The aforementioned vehicle operation may comprises one or more manual operations executed by a driver residing on the industrial vehicle, one or more automated operations executed with the assistance of a remote computer or a computer residing on the industrial vehicle, or combinations thereof. It is contemplated that the operations can be selected from a vehicle navigating operation, a vehicle positioning operation, a vehicle steering operation, a vehicle speed control operation, a load engagement operation, a lifting operation, a vehicle status alert display, or combinations thereof.

The physical environment 100 may include a warehouse or cold store for housing the plurality of units 114 in preparation for future transportation. Warehouses may include loading docks to load and unload the plurality of units from commercial vehicles, railways, airports and/or seaports. The plurality of units 114 generally include various goods, products and/or raw materials and/or the like. For example, the plurality of units 114 may be consumer goods that are placed on ISO standard pallets and loaded into pallet racks by forklifts to be distributed to retail stores. The industrial vehicle 102 facilitates such a distribution by moving the consumer goods to designated locations where commercial vehicles (e.g., trucks) load and subsequently deliver the consumer goods to one or more target destinations.

According to one or more embodiments, the vehicle 102 may be an automated guided vehicle (AGV), such as an automated forklift, which is configured to handle and/or move the plurality of units 114 about the floor 110. The vehicle 102 utilizes one or more lifting elements, such as forks, to lift one or more units 114 and then, transport these units 114 along a path to be placed at a designated location. Alternatively, the one or more units 114 may be arranged on a pallet 112 of which the vehicle 102 lifts and moves to the designated location.

Each of the plurality of pallets 112 is a flat transport structure that supports goods in a stable fashion while being lifted by the vehicle 102 and/or another jacking device (e.g., a pallet jack and/or a front loader). The pallet 112 is the structural foundation of an object load and permits handling and storage efficiencies. Various ones of the plurality of pallets 112 may be utilized within a rack system (not pictured). Within one type rack system, gravity rollers or tracks allow one or more units 114 on one or more pallets 112 to flow to the front. The one or more pallets 112 move forward until slowed or stopped by a retarding device, a physical stop or another pallet 112. In another type of rack, the pallets are placed on horizontal bars that interlock with the pallet structure. In this type of racking, the pallets on the lowest level are placed on the floor and protrude beyond the rack face, making it difficult to use the rack uprights as a navigational reference.

In some embodiments, the mobile computer 104 and the central computer 106 are computing devices that control the vehicle 102 and perform various tasks within physical environment 100. The mobile computer 104 is adapted to couple with vehicle 102 as illustrated. The mobile computer 104 may also receive and aggregate data (e.g., laser scanner data, image data, and/or any other related sensor data) that is transmitted by the sensor array 108. Various software modules within the mobile computer 104 control operation of the vehicle 102 as explained further below.

In many instances, some areas of the environment 100 are designated as block storage areas. In these areas, pallets 112 supporting a plurality of units 114 are stacked. Typically, these areas contain many rows of product, each of which is many pallets deep. Such stacked pallets are typically sufficiently high that beacons 116 or other items of fixed infrastructure are invisible to an industrial vehicle that is deep in a row of pallets.

In some embodiments, the mobile computer 104 is configured to determine a vehicle pose at start-up, which requires localization with respect to overview map without any knowledge of a previous vehicle pose. The overview map provides a-priori map data in a global coordinate system. Once the mobile computer 104 determines that a vehicle pose of the industrial vehicle 102 is unknown (e.g., when the automation system has just been started), the mobile computer 104 performs a search to determine the most likely position of the industrial vehicle 102 using various measurements extracted from sensor data, such as the geometry of the features (e.g. angles, lengths, radii). Based on the vehicle pose, the mobile computer 104 subsequently determines a path for completing a task within the physical environment 100.

In some embodiments, the mobile computer 104 uses a unique navigational beacon 116, such as a reflective barcode to determine an initial position. In other embodiments, the mobile computer recognizes a pre-placed pallet containing product and plans a path to the pre-placed product and navigates the industrial vehicle 102 such that the barcode on the product can be read. The mobile computer 104 then requests from the central computer 106 the location of the preplaced product and uses this location to determine an initial position for the vehicle. In further embodiments, the mobile computer 104 determines from various environment measurements that the industrial vehicle is located in a racking aisle and plans a path and drives the industrial vehicle to a location in the aisle, typically the end of the aisle, where sufficient unique landmarks can be measured to determine an initial position. It will be recognized by those skilled in the art that the industrial vehicle 102 requires an initial position in order to navigate successfully; however, embodiments of the invention described below use an initial position estimate to facilitate navigation when driving is required to determine a correct initial position.

As explained further below, the mobile computer 104 defines one or more sub-areas within the physical environment 100 for facilitating localization. It is appreciated, that the mobile computer 104 is not limited to performing start-up localization. Each of these sub-areas corresponds with a unique landmark, such as one of the plurality of markers 116 or one of the plurality of objects. Once the marker is recognized, the location of the sub-area associated with the marker will be used as start-up location estimate, once an initial position estimate is determined all sensor inputs are tested to ensure the sensor data is consistent with the estimated position and the position is refined to the final start-up position.

For example, and not by way of limitation, a unique landmark may include a placed item, such as one of the pallets 112 or one of the plurality of items 114 placed thereon, which can be uniquely identified (e.g. with a unique barcode, RFID, shape, or other attribute that is identifiable by the sensors of an industrial vehicle 102). In this case, when a pallet 112 and/or product load is scanned, picked-up, or otherwise engaged, the known location of such object, which can be stored, for example, in a warehouse management system database, can be used as a marker in a process for determining vehicle pose.

As another example, the plurality of markers 116 may include a plurality of beacons located at certain positions within the corresponding sub-areas arranged in a known and unique constellation. Alternatively, the unique landmark may include a reflective barcode, a visual glyph, an arrangement of light source elements that are configured to generate a unique light source signature, an arrangement of electrical, magnetic, or electromagnetic elements that are configured to generate a unique magnetic field signature, or unique painted or unpainted floor markings.

In one embodiment, the plurality of markers 116 comprise RF or other measurable wave signals that carry unique signatures and can be analyzed independently by corresponding sensor electronics on the vehicle to determine vehicle pose through triangulation.

As soon as the mobile computer 104 recognizes one of the unique landmarks, various software modules determine in which specific sub-area the industrial vehicle is located. If such a vehicle location is computed at start-up, the mobile computer 104 loads a corresponding sub-area map from a database as explained in detail further below. Alternatively, the mobile computer 104 only needs to request a specific sub-area map from the central computer 106 in order to navigate the industrial vehicle 102.

Figure 2:
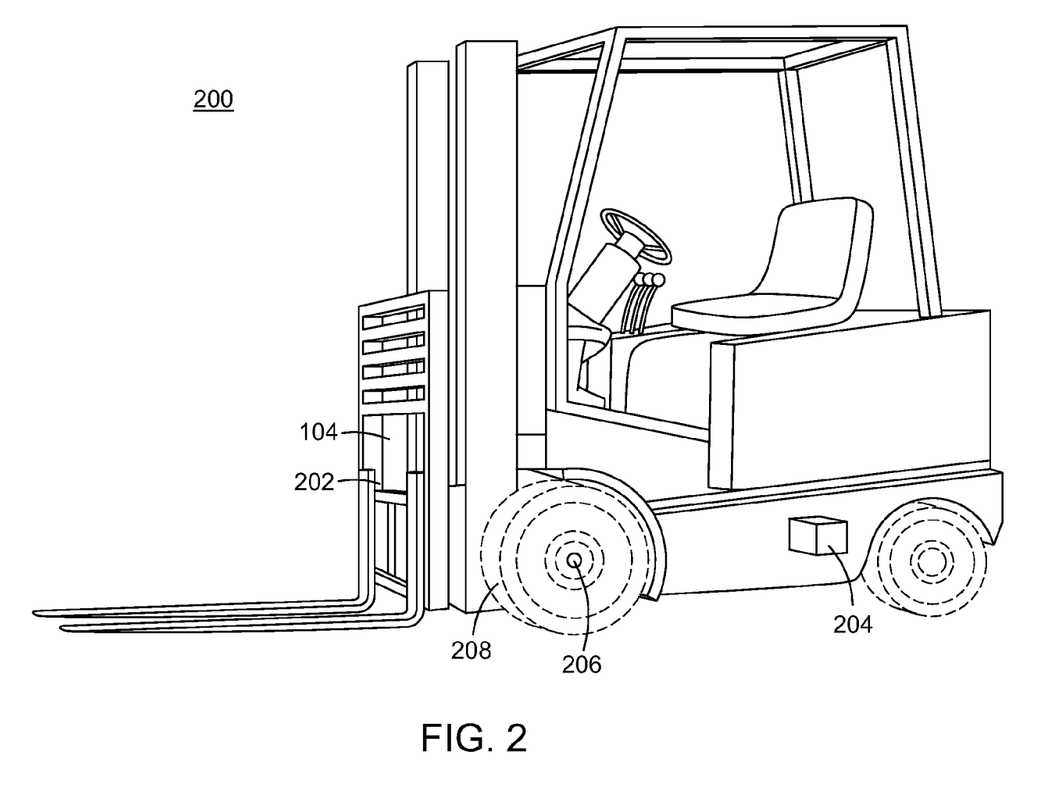
FIG. 2 illustrates a perspective view of the forklift for navigating a physical environment to perform various tasks according to one or more embodiments.

FIG. 2 illustrates a perspective view of the forklift 200 for facilitating automation of various tasks within a physical environment according to one or more embodiments of the present invention.

The forklift 200 (i.e., a lift truck, a high/low, a stacker-truck, trailer loader, sideloader, or a fork hoist) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The paths may be pre-defined or dynamically computed as tasks are received. The forklift 200 may travel inside a storage bay that is multiple pallet positions deep to place or retrieve a pallet. Oftentimes, the forklift 200 is guided into the storage bay and places the pallet on cantilevered arms or rails. Hence, the dimensions of the forklift 200, including overall width and mast width, must be accurate when determining an orientation associated with an object and/or a target destination.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils, and/or the like). In one embodiment, the forklift 200 includes hydraulics-powered, telescopic forks that permit two or more pallets to be placed behind each other without an aisle between these pallets.

The forklift 200 may further include various mechanical, hydraulic, and/or electrically operated actuators according to one or more embodiments. In some embodiments, the forklift 200 includes one or more hydraulic actuator (not labeled) that permit lateral and/or rotational movement of two or more forks. In one embodiment, the forklift 200 includes a hydraulic actuator (not labeled) for moving the forks together and apart. In another embodiment, the forklift 200 includes a mechanical or hydraulic component for squeezing a unit (e.g., barrels, kegs, paper rolls, and/or the like) to be transported.

The forklift 200 may be coupled with the mobile computer 104, which includes software modules for operating the forklift 200 in accordance with one or more tasks. The forklift 200 is also coupled with an array comprising various sensor devices (e.g., the sensor array 108 of FIG. 1), which transmits sensor data (e.g., image data, video data, range map data, and/or three-dimensional graph data) to the mobile computer 104 for extracting information associated with environmental features. These devices may be mounted to the forklift 200 at any exterior and/or interior position or mounted at known locations around the physical environment 100. Exemplary embodiments of the sensors mounted on the forklift 200 typically include a camera 202, a planar laser scanner 204 attached to each side, and/or an encoder 206 attached to each wheel 208. In other embodiments, the forklift 200 includes only the planar laser scanner 204 and the encoder 206. In still further embodiments, the forklift 200 includes only the camera 202 and the encoder 206. The forklift 200 may use any sensor array with a field of view that extends to a current direction of motion (e.g., travel forwards, backwards, fork motion up/down, reach out/in, and/or the like). These encoders determine motion data related to vehicle movement. Externally mounted sensors may include laser scanners or cameras positioned where the rich data set available from such sensors would enhance automated operations. External sensors may include a limited set transponders and/or other active or passive means by which an automated vehicle could obtain an approximate position to seed a localization function. In some embodiments, a number of sensor devices (e.g., laser scanners, laser range finders, encoders, pressure transducers, and/or the like) as well as their position on the forklift 200 are vehicle dependent, and the position at which these sensors are mounted affects the processing of the measurement data. For example, by ensuring that all of the laser scanners are placed at a measurable position, the sensor array 108 may process the laser scan data and transpose it to a center point for the forklift 200. Furthermore, the sensor array 108 may combine multiple laser scans into a single virtual laser scan, which may be used by various software modules to control the forklift 200.

Figure 3:
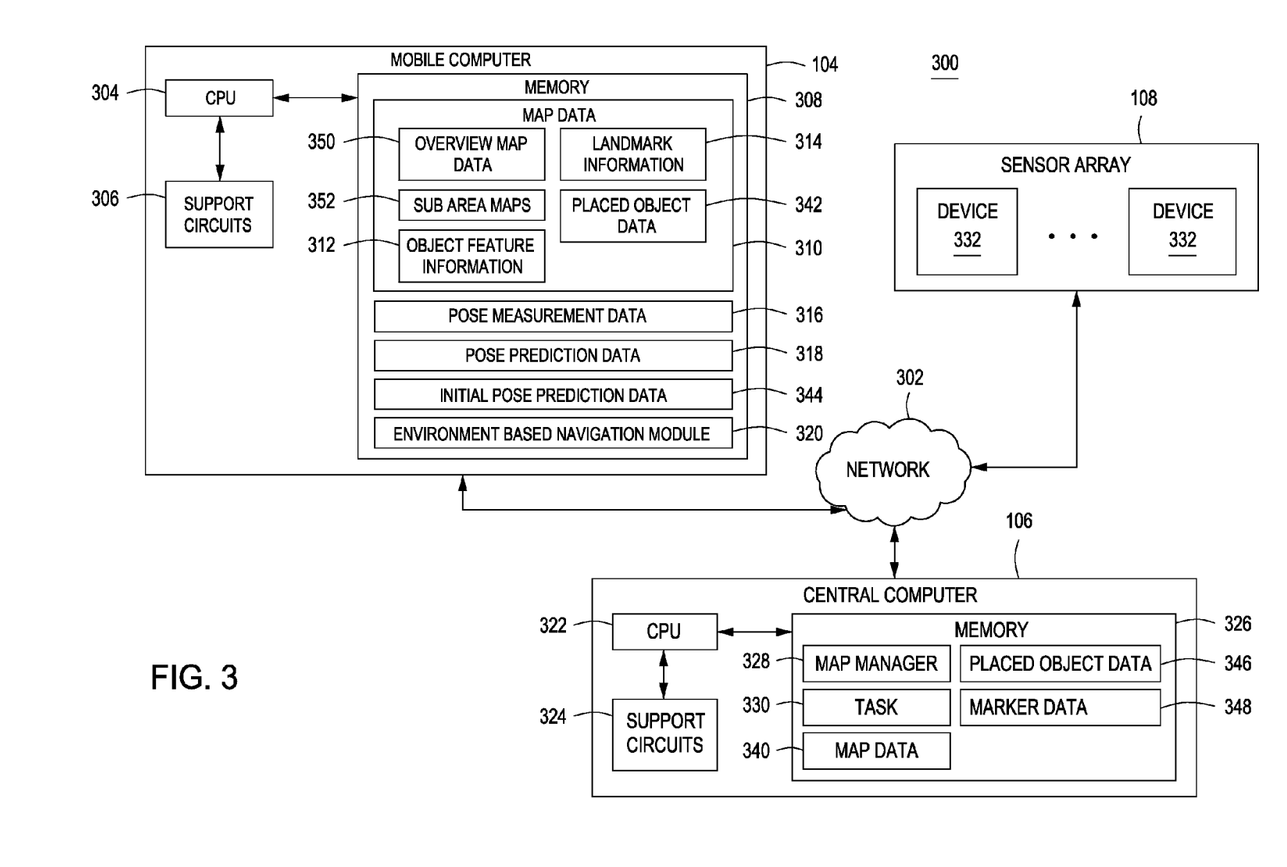
FIG. 3 is a structural block diagram of a system for using unique landmarks to position an industrial vehicle at start-up according to one or more embodiments.

FIG. 3 is a structural block diagram of a system 300 for providing accurate start-up localization for an industrial vehicle according to one or more embodiments. In some embodiments, the system 300 includes the mobile computer 104, the central computer 106 and the sensor array 108 in which each component is coupled to each other through a network 302.

The mobile computer 104 is a type of computing device (e.g., a laptop, a desktop, a Personal Desk Assistant (PDA) and the like) that comprises a central processing unit (CPU) 304, various support circuits 306 and a memory 308. The CPU 304 may comprise one or more commercially available microprocessors or microcontrollers that facilitate data processing and storage. Various support circuits 306 facilitate operation of the CPU 304 and may include clock circuits, buses, power supplies, input/output circuits, and/or the like. The memory 308 includes a read only memory, random access memory, disk drive storage, optical storage, removable storage, and the like. The memory 308 includes various data, such as map data 310 the pose measurement data 316 pose prediction data 318, and initial pose prediction data 344. The map data includes: overview map data 350, sub-area maps 352, object feature information 312, landmark information 314, and placed (pre-positioned) object model data 342. The memory 308 includes various software packages, such as an environment based navigation module 320.

The central computer 106 is a type of computing device (e.g., a laptop, a desktop computer, a Personal Desk Assistant (PDA) and the like) that comprises a central processing unit (CPU) 322, various support circuits 324 and a memory 326. The CPU 322 may comprise one or more commercially available microprocessors or microcontrollers that facilitate data processing and storage. Various support circuits 324 facilitate operation of the CPU 322 and may include clock circuits, buses, power supplies, input/output circuits, and/or the like. The memory 326 includes a read only memory, random access memory, disk drive storage, optical storage, removable storage, and the like. The memory 326 includes various software packages, such as a map manager 328 and a task manager (not shown), as well as various data, such as a task 330.

The network 302 comprises a communication system that connects computing devices by wire, cable, fiber optic, and/or wireless links facilitated by various types of well-known network elements, such as hubs, switches, routers, and the like. The network 302 may employ various well-known protocols to communicate information amongst the network resources. For example, the network 302 may be part of the Internet or intranets using various communications infrastructure such as Ethernet, WiFi, WiMax, General Packet Radio Service (GPRS), and the like.

The sensor array 108 is communicably coupled to the mobile computer 104, which is attached to an automated vehicle, such as a forklift (e.g., the forklift 200 of FIG. 2). The sensor array 108 includes a plurality of devices 332 for monitoring a physical environment and capturing various data, which is stored by the mobile computer 104. In some embodiments, the sensor array 108 may include any combination of one or more laser scanners and/or one or more cameras. In some embodiments, the plurality of devices 332 may be mounted to the automated industrial vehicle. For example, a laser scanner and a camera may be attached to a lift carriage at a position above or, alternatively, below the forks.

In some embodiments, the map data 310 includes overview map data 350 which is used by the environment based navigation module 320 to evaluate the environment during start-up. The overview map data may include data identifying a variety of start-up scenarios, including the features to be observed in each scenario. For example, the overview map data may provide a generic aisle feature model, a generic blocked stack area feature model, feature models of environment walls and fixed infrastructure that may be unique, and unique navigational marker models such as a reflective beacon model. The environment based navigation module 320, when starting up, uses the overview map data to identify the start-up scenario as described further below.

In some embodiments, the map data 310 includes landmarks, which may be dynamic or static, from a physical environment, such as a shared use area for human workers and automated industrial vehicles. Each landmark is comprised of features which are sensor observable views of the associated landmarks. The map data 310 may include a vector of known observed and/or expected features. In some embodiments, the map data 310 indicates locations of objects (e.g., pre-positioned objects) throughout the physical environment. The physical environment may be segmented into a plurality of sub-areas with corresponding map data stored in the plurality of sub-area maps 352. Sub-area map generation is described in commonly assigned, U.S. patent application Ser. No. 13/159,501, filed Jun. 14, 2011, which is herein incorporated by reference in its entirety. The object feature information 312 defines features (e.g., curves, lines, and/or the like) associated with one or more infrastructure, obstacle, or pre-positioned objects. As described in further detail below, the environment based navigation module 320 may designate some of the one or more pre-positioned objects as unique landmarks that correspond to specific map sub-areas. The pre-positioned object is uniquely identifiable through the use of barcodes, RFID, specific shape, or any other unique feature that can be sensed by the sensors of an industrial vehicle. Once the object is identified, pre-positioned object data 342 may be accessed to inform the mobile computer 104 the details of the pre-positioned object, i.e., the pose of the object. If the object data for the identified object is not locally stored as data 342, the mobile computer can request the information from the central computer 106. The central computer 106 maintains placed object data 346 containing information regarding all pre-positioned objects. The pre-positioned object data 342 (i.e., pose of the pre-positioned object) is used by the mobile computer 104 to determine an accurate, initial vehicle pose.

After a pre-positioned object is used to compute an initial vehicle pose, the vehicle is capable of operating autonomously. In some embodiments, the map data 310 indicates locations for at least one landmark as defined in the landmark information 314. The landmark information 314 identifies a number of features that form each of the at least one landmark as well as other data, such as a landmark type, a location, measurement data, and/or the like. Some of the at least one landmarks are proximate to the industrial vehicle. For example, these proximate landmarks and the industrial vehicle may be co-located within a certain sub-area of the physical environment. By comparing feature information associated with the proximate landmarks with feature information associated with the unique landmarks, the environment based navigation module 320 determines an accurate vehicle pose.

In some embodiments, the pose measurement data 316 includes an aggregation of data transmitted by the plurality of devices 332. Such data indicates one or more observed features. In one embodiment, the one or more cameras transmit image data and/or video data of the physical environment that are relative to a vehicle. In another embodiment, the one or more laser scanners (e.g., three-dimensional laser scanners) analyze objects within the physical environment and capture data relating to various physical attributes, such as size and shape. The captured data can then be compared with three-dimensional object models. The laser scanner creates a point cloud of geometric samples on the surface of the subject. These points can then be used to extrapolate the shape of the subject (i.e., reconstruction). The laser scanners have a cone-shaped field of view. While the cameras record color information associated with object surfaces within each and every field of views, the laser scanners record distance information about these object surfaces.

The data produced by the laser scanner indicates a distance to each point on each object surface. Based on these distances, the environment based navigation module 320 determines a three-dimensional position of the each point in a local coordinate system relative to each laser scanner. The environment based navigation module 320 transposes each three-dimensional position to be relative to the vehicle. The laser scanners perform multiple scans from different perspectives in order to determine the points on the each and every object surface. The environment navigation module 320 normalizes the data produced by the multiple scans by aligning the distances along a common reference system, such as a global coordinate system. Then, these software modules merge the object features to create a model of the objects within a partial field of view.

In some embodiments, the pose prediction data 318 includes an estimate of vehicle position and/or orientation of which the present disclosure may refer to as the vehicle pose prediction. Initial pose prediction data 344 is available from the pre-positioned object data 342. Once a mobile computer 104 utilizes the initial pose prediction data 344, the environment based navigation module 320 produces updated estimates using a prior vehicle pose in addition to the sensor measurements to indicate an amount of movement (e.g. inertial measurement unit (IMU) or odometer). The environment based navigation module 320 may also use a process filter to estimate uncertainty and/or noise for an upcoming vehicle pose prediction and update steps. Using odometry data, for example, the environment based navigation module 320 computes the distance traveled by the industrial vehicle from a prior vehicle position, along with uncertainty of the pose given by the noise model of the odometry device. After subsequently referencing a map of the physical environment, and comparing other sensory data (e.g. laser range sensor, camera) with the map, the environment based navigation module 320 determines a more accurate estimate of a current vehicle position and update the pose uncertainty.

The environment based navigation module 320 includes processor-executable instructions for localizing the industrial vehicle 102 using unique landmarks according to some embodiments. In some embodiments, the environment based navigation module 320 designates a unique landmark (e.g., one of the plurality of items 114 or the plurality of markers 116 of FIG. 1) corresponding with a specific portion or sub-area of the physical environment. The environment based navigation module 320 may estimate an initial vehicle pose using a pre-positioned object (e.g., a placed product item or a pallet) or a placed landmark (e.g., a marker, such as a reflective navigation beacon). Using the object feature information 312, the environment based navigation module 320 updates the map data 310 to include the pre-positioned object or an empty slot that constitutes a lack of the pre-positioned object.

Figure 4:
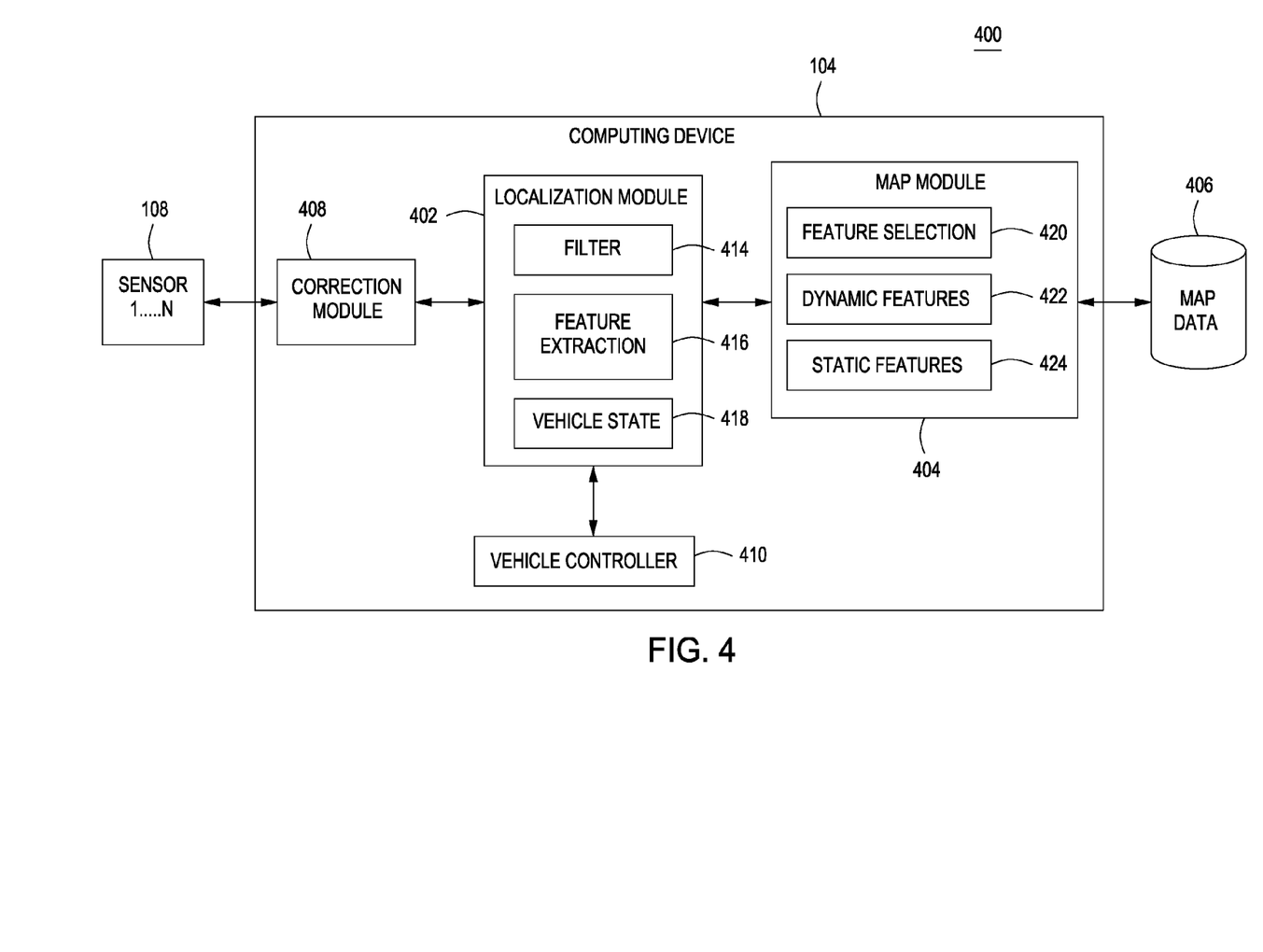
FIG. 4 is a functional block diagram of a system for providing accurate localization for an industrial vehicle according to one or more embodiments.

FIG. 4 is a functional block diagram of a system 400 for providing accurate localization for an industrial vehicle according to one or more embodiments. The system 400 includes the mobile computer 104, which couples to an industrial vehicle, such as a forklift, as well as the sensor array 108. Various software modules within the mobile computer 104 collectively form an environment based navigation module (e.g., the environment based navigation module 320 of FIG. 3).

The mobile computer 104 includes various software modules (i.e., components) for performing navigational functions, such as a localization module 402, a mapping module 404, a correction module 408, and a vehicle controller 410. The mobile computer 104 provides accurate localization for the industrial vehicle and updates map data 406 with current pose measurements. The localization module 402 also includes various components, such as a filter 414 and a feature extraction module 416. The map module 404 includes various data, such as a vehicle pose 418 and dynamic features 422. The map module 404 also includes various components, such as a feature selection module 420.

In some embodiments, the localization module 402 processes corrected sensor data from the correction module and modifies observed pose measurements therein. After comparing these pose measurements with a pose prediction, the filter 414 updates the pose prediction to account for an incorrect estimation and/or observation uncertainty. The filter 414 determines the vehicle pose 418 and communicates the pose to the mapping module 404. The vehicle pose 418, which is modeled by the filter 414, includes data (e.g., coordinates) indicating vehicle position and/or orientation. The localization module 402 communicates data associated with the vehicle pose 418 to the mapping module 404 while also communicating such data to the vehicle controller 410. Based on the vehicle position and orientation, the vehicle controller 410 navigates the industrial vehicle to a destination.

In addition to the filter 414 for calculating the vehicle pose 418, the localization module 414 also includes the feature extraction module 416 for extracting known standard features from the corrected sensor data. The feature selection module 420 compares the vehicle pose 418 with the map data to select a sub-area map (the sub-area map 352 of FIG. 3) proximate to the vehicle. The feature selection module further selects from a available dynamic features 422 and static features 424 to provide the localization module 402 with a reduced number of features to examine by eliminating potentially invisible features from the feature set 422/424. The feature selection module 420 manages addition and modification of the dynamic features 422 to the map data 406. The feature selection module 420 can update the map data 406 to indicate areas recently occupied or cleared of certain features, such as known placed (pre-positioned) and picked objects.

It is appreciated that the system 400 may employ several computing devices to perform environment based navigation. Any of the software modules within the computing device 104 may be deployed on different or multiple physical hardware components, such as other computing devices. The mapping module 404, for instance, may be executed on a server computer (e.g., the central computer 106 of FIG. 1) over a network (e.g., the network 302 of FIG. 4) to connect with multiple mobile computing devices for the purpose of sharing and updating the map data 406 with a current vehicle position and orientation.

In some embodiments, the correction module 402 processes sensor input messages from disparate data sources, such as the sensor array 108, having different sample/publish rates for the vehicle pose 418 as well as different (internal) system delays. The correction module 402 extracts observed pose measurements from the sensor data within these messages. The correction module 402 examines each message separately in order to preserve the consistency of each observation. Such an examination may be performed in place of fusing the sensor data to avoid any dead reckoning errors. Notice that with different sampling periods and different system delays, the order at which the sensor data is acquired is not the same as the order at which the sensor input messages eventually became available to the computing device 104.

Figure 5:
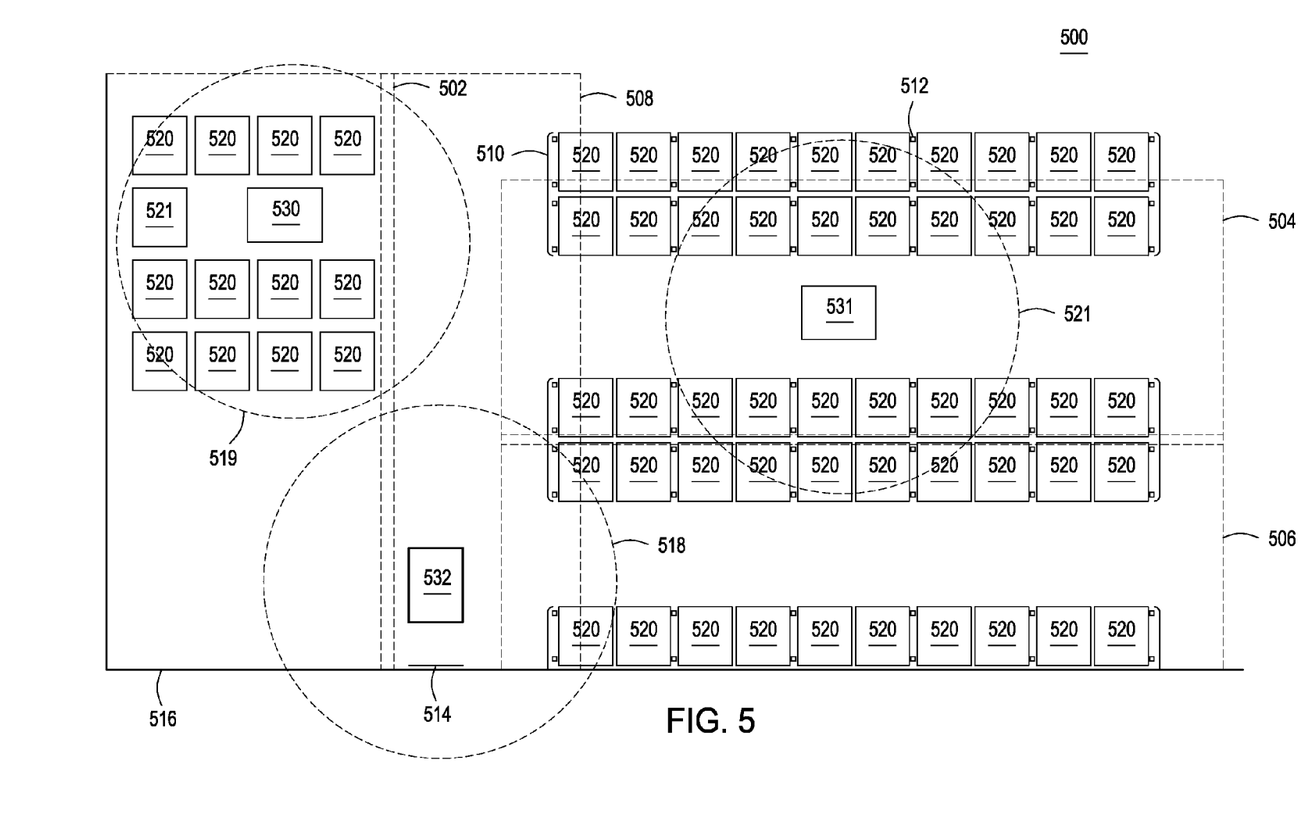
FIG. 5 is a schematic illustration of a map for a physical environment comprising unique landmarks according to one or more landmarks.

FIG. 5 is a schematic illustration of a map 500 for a physical environment comprising pre-positioned objects and unique landmarks according to one or more embodiments of the invention. The map 500 is partitioned into a sub-area 502, a sub-area 504, a sub-area 506, and a sub-area 508, where each sub-area presents a different start-up problem which is solved as further described below. The map 500 depicts three industrial vehicles 530/531/532 (e.g. the industrial vehicle 102 of FIG. 1) to be located in sub-areas 502/504 and 508. At start-up, the industrial vehicle 530/531/532 has no information about its pose, or which sub-area the vehicle is currently located. Sensors (e.g., laser scanners) coupled to the industrial vehicle 102 process measurement data within a range 518. The environment (e.g., the physical environment 100 of FIG. 1) also contains fixed landmarks such as walls 516, rack protectors 510, racking legs 512, and a placed unique navigational marker 514. The environment also includes a plurality of pre-positioned objects 520 and 521 for which the environment based navigation module e.g. the environment based navigation module 320 of FIG. 3) can obtain position data from the map manager (e.g., the map manager 340 of FIG. 3).

In one embodiment, during start-up, the industrial vehicle 532 evaluates features within the range 518; the vehicle 532 senses a unique navigational landmark 514. The landmark 514 is a navigational beacon (e.g., the navigational beacons 116 of FIG. 1) and may include various types of geometric markers. In some embodiments, the marker 514 is a navigational beacon having a reflective portion (e.g., a reflective surface), which may be identified using the laser scanner (e.g. the laser scanner 204 of FIG. 2). Instead of the reflective portion, the marker 514 may include a two-dimensional barcode that is extracted using image processing. The marker 514 may form a unique combination of features differing from any other marker. In some embodiments, reflectors are artificial navigational beacons that are used as unique landmarks for performing start-up localization with respect to the overview map. The laser scanner returns intensity information associated with the reflectors during laser scans when a laser beam contacts an object having a reflective index above a certain threshold. Hence, if the marker 512 is a reflector, the marker 514 is easily recognizable from a laser scan. On detecting a unique marker, the environment based navigation module (e.g., the environment based navigation module 320 of FIG. 3) references the marker data (e.g., the marker data 348 of FIG. 3) to find a location of the navigational landmark. The environment based navigation module will then use the pose measurement data for the landmark (e.g., the pose measurement data 316 of FIG. 3) to determine the initial pose prediction data (e.g., the initial pose prediction data 344 of FIG. 3) for the industrial vehicle. Using the initial pose, the environment based navigation module selects a current sub-area as area 508 and obtains a sub-area map for this area (e.g., the sub area map 352 of FIG. 3). The environment navigation module will then refine the position using observable features from the sub-area such as the wall 516 and the rack protectors 510. The refined position will be used as the new pose and the industrial vehicle will be in a position to reliably navigate and complete tasks.

In another embodiment, the industrial vehicle 530, when performing a start-up scan of the environment within the scanning range 519, detects a number of pre-positioned objects 520 and 521. The pre-positioned objects are recognized by matching scan data with placed object data (e.g., the placed object data 344 of FIG. 3). The industrial vehicle 530 determines that it is in a row of products by evaluating the relative positions of the sensed features against a model of the block stacked object rows data provided as part of the overview map (e.g., the overview map 350 of FIG. 3). The industrial vehicle could be in any one of a plurality of block stacked product rows and there is insufficient initial data to determine a precise location. The industrial vehicle identifies that the block stacked product rows are in sub-area 502 of the map 500 by accessing the overview map. The industrial vehicle then access the sub-area map 502. The industrial vehicle selects a candidate row of block stacked product using the information on pre-positioned product that matches the feature information received from the laser scanners. This candidate may be inaccurate but provides a position from which the industrial vehicle can navigate to a location where the position may be refined. The industrial vehicle estimates the initial pose (e.g., the initial pose prediction data 344 of FIG. 3). The industrial vehicle then triggers a start-up task associated with a blocked stacked area (e.g., the tasks 330 of FIG. 3) to drive the vehicle to scan the product 521. The pre-positioned object 521 is uniquely identifiable through the use of barcodes, RFID, specific shape, or any other unique feature that can be sensed by the sensors of an industrial vehicle. The industrial vehicle identifies the pre-positioned product 521 using a barcode scanner. Alternatively, the industrial vehicle may scan an RFID, match the product using an image, read a label on the product from an image, or use other identification means understood by those skilled in the art. The industrial vehicle 530 accesses the position of the product 521 from the placed object data (e.g., the placed object data 346 of FIG. 3). Alternatively, the industrial vehicle may request a location of the pre-positioned object 521 from an external system such as a Warehouse Management System. Once the industrial vehicle has a position from the pre-positioned object 521, a new start-up pose estimate is developed using the object position.

In another embodiment, the industrial vehicle 531 identifies that it is in a racking aisle row by matching the scanned features to an aisle model provided in the overview map data (e.g., the overview map data 350 of FIG. 3) by matching to pre-positioned products 520 and the racking legs 512 that are visible within the scanning range 521. The industrial vehicle 531 cannot determine a unique position from the initial scan but can develop a initial pose estimate that is sufficient to navigate reliably to either a specific pre-positioned object 520, or down the row of racking to one end or the other. The industrial vehicle 531 triggers a start-up task to drive to the selected position. If the selected position is a location to scan a pre-positioned object, the position of the object is used to provide a refined start-up position as described above. Alternatively, if the end of the racking aisle is the selected position, the industrial vehicle is able to sense the racking protectors 510 on which a unique navigational marker may be positioned and develop a refined start-up position using the unique navigational marker as described above.

Figure 6:
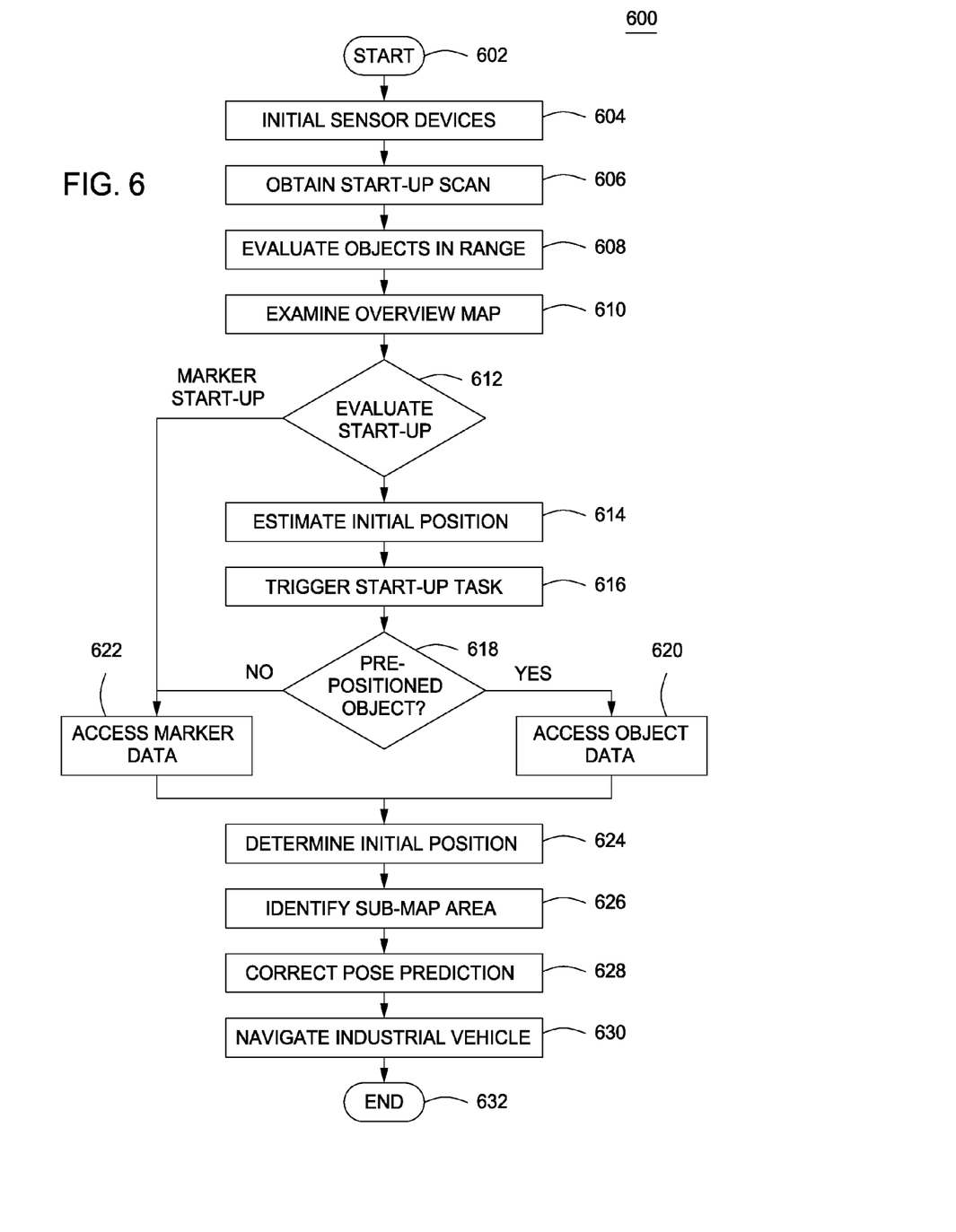
FIG. 6 is a flow diagram of a method of localizing an industrial vehicle with respect to an overview map at start-up.

FIG. 6 is a flow diagram of a method 600 for localizing an industrial vehicle at start-up with respect to a overview map according to one or more embodiments. In some embodiments, an environment based navigation module (e.g., the environment based navigation module 320 of FIG. 3) performs each and every step of the method 600. In other embodiments, some steps are omitted or skipped. The environment based navigation module is stored within a mobile computer (e.g., the mobile computer 104 of FIG. 1) that is operably coupled to an industrial vehicle (e.g., the industrial vehicle 102 of FIG. 1). A central computer (e.g., the central computer 106 of FIG. 1) includes a manager (e.g., the manager 328 of FIG. 3) for communicating with the industrial vehicle as well as one or more second industrial vehicles. When performing a task (e.g., the task 330 of FIG. 3), a task manager communicates instructions for executing the task. For example, the task manager may instruct the environment based navigation module to navigate the industrial vehicle along a particular path. The method 600 starts at step 602 and proceeds to step 604.

At step 604, the method 600 initializes the sensors required for navigation. At step 606, the environment based navigation module (e.g., the environment based navigation module 320 of FIG. 3) obtains the start-up scan data from the attached sensors. A start-up scan may be repeated to perform a plurality of scans to create the start-up scan data. At step 608, the method 600 evaluates the information obtained in the start-up scan to extract the features of the objects in range and indentify landmark types from the features including extracting reflective beacons, pre-positioned objects, and other navigational references. At step 610, the method 600 examines the overview map data (e.g., the overview map data 350 of FIG. 3) to associate extracted objects with the plurality of target start-up localization candidates. At step 612, the method 600 evaluates the start-up scenario. If a reflective barcode or other unique marker (landmark) has been identified, the method 600 proceeds to step 622; otherwise, the method 600 proceeds to step 614.

At step 614, the method 600 creates an initial position estimate, which is one of a plurality of potential positions based on the scenario determined from the start-up scan and the overview map. At step 616, the method 600 triggers a start-up task associated with the identified scenario that will navigate the industrial vehicle to a position where a refined navigational position estimate may be found. The start-up task drives the vehicle to the designated position and new landmark data is obtained. At step 618, the method 600 determines whether the refined navigational position is to be obtained from a pre-positioned object or a unique marker. If a pre-positioned object identifier is to be used, the method 600 proceeds to step 620. If a unique marker is to be used, the method 600 proceeds to step 622. At step 620, the method 600 obtains information about the prepositioned object, especially its position on the overview map. At step 622, the method 600 obtains information about the unique marker arrangement including the position on the overview map.

At step 624, the method 600 determines a new initial position by calculating the vehicle position relative to the retrieved landmark pose. At step 626, the method 600 identifies a sub-area map in which the industrial vehicle is located. At step 628, the method 600 corrects the initial position by evaluating other features available from the sub-area map and matching them to the information obtained from the vehicle's sensors. At step 630, the method 600 navigates the industrial vehicle according to one or more assigned tasks. At step 632, the method 600 ends.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

What is claimed is:

1. A method of correcting pose uncertainty when operating an industrial vehicle comprising one or more sensors, one or more lifting elements, and a mobile computer, wherein the method comprises using the industrial vehicle to:
   receive measurement data from the one or more sensors of the industrial vehicle;
   estimate a current pose of the industrial vehicle in an environment based on the measurement data;
   navigate the industrial vehicle to a pallet or product load utilizing the current pose estimate and data from the one or more sensors of the industrial vehicle;
   automatically pick-up the pallet or product load with the one or more lifting elements of the industrial vehicle;
   retrieve a position of the automatically picked-up pallet or product load from placed object data associated with the automatically picked-up pallet or product load;
   develop a new pose of the industrial vehicle using the retrieved position of the automatically picked-up pallet or product load; and
   navigate the industrial vehicle through the environment utilizing the new pose and data from the one or more sensors of the industrial vehicle.

2. The method of claim 1, wherein the mobile computer is used to scan the pallet or product load for a unique identifier with the one or more sensors of the industrial vehicle.

3. The method of claim 2, wherein the placed object data is associated with the unique identifier stored in a warehouse management system.

4. The method of claim 1, wherein the position of the pallet or product load is retrieved from a central computer.

5. The method of claim 4, wherein the position of the pallet or product load comprises an object identity and an object pose.

6. The method of claim 4, wherein the central computer is a warehouse management system.

7. The method of claim 1, wherein the mobile computer is mounted to the industrial vehicle.

8. The method of claim 1, wherein the industrial vehicle is an automated guided vehicle.

9. The method of claim 1, wherein the environment is segmented into a plurality of sub-areas.

\* \* \* \* \*

UNITED STATES PATENT AND TRADEMARK OFFICE
CERTIFICATE OF CORRECTION

PATENT NO. : 9,580,285 B2
APPLICATION NO. : 14/254953
DATED : February 28, 2017
INVENTOR(S) : Lisa Wong et al.

Page 1 of 2

It is certified that error appears in the above-identified patent and that said Letters Patent is hereby corrected as shown below:

In the Specification

Column 3, Line 45:
"The aforementioned vehicle operation may comprises one"
Should read:
--The aforementioned vehicle operation may comprise one--;

Column 6, Line 34:
"lift 200 includes one or more hydraulic actuator (not labeled)"
Should read:
--lift 200 includes one or more hydraulic actuators (not labeled)--;

Column 10, Line 61:
"further selects from a available dynamic features 422 and"
Should read:
--further selects from available dynamic features 422 and--;

Column 12, Line 38:
"trial vehicle then access the sub-area map 502. The industrial"
Should read:
--trial vehicle then accesses the sub-area map 502. The industrial--;

Column 13, Line 6:
"initial scan but can develop a initial pose estimate that is"
Should read:
--initial scan but can develop an initial pose estimate that is--; and Signed and Sealed this
Tenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,580,285 B2

In the Claims

Column 14, Claim 2, Line 53:
"is used to scan the pallet or product load for a unique"
Should read:
--is further used to scan the pallet or product load for a unique--.